United States Patent
Spengler et al.

(10) Patent No.: US 7,101,503 B2
(45) Date of Patent: Sep. 5, 2006

(54) MOLDING METHOD AND APPARATUS WITH PLURAL COOPERATING MOLD TOOLS FOR FORMING INTERIOR TRIM COMPONENTS FOR MOTOR VEHICLES

(75) Inventors: Ernst Maximilian Spengler, Heusenstamm (DE); Gerhard Spengler, Frankfurt am Main (DE)

(73) Assignee: R + S Technik GmbH, Offenbach am Main (DE)

( * ) Notice: Subject to any disclaimer, the term of this patent is extended or adjusted under 35 U.S.C. 154(b) by 341 days.

(21) Appl. No.: 10/370,012

(22) Filed: Feb. 18, 2003

(65) Prior Publication Data

US 2003/0155685 A1    Aug. 21, 2003

(30) Foreign Application Priority Data

Feb. 15, 2002   (CS) .................................. 2002-580
Aug. 27, 2002   (CS) ................................ 2002-2899

(51) Int. Cl.
   *B29C 69/02*   (2006.01)
(52) U.S. Cl. ...................... 264/250; 425/515; 425/519; 425/521
(58) Field of Classification Search ................ 425/515, 425/519, 521, 510, 512, 513, 504, 195; 156/500; 264/250

See application file for complete search history.

(56) References Cited

U.S. PATENT DOCUMENTS

| | | | |
|---|---|---|---|
| 1,590,768 A * | 6/1926 | Mahoney ..................... 156/156 |
| 4,378,265 A * | 3/1983 | Kiss ............................ 156/242 |
| 4,636,348 A * | 1/1987 | Whiteside ................... 264/544 |
| 4,923,539 A | 5/1990 | Spengler et al. |
| 5,076,880 A | 12/1991 | Spengler et al. |
| 5,249,946 A * | 10/1993 | Marx .......................... 425/142 |
| 5,324,384 A | 6/1994 | Spengler |
| 5,413,661 A | 5/1995 | Spengler et al. |
| 5,709,925 A | 1/1998 | Spengler et al. |
| 5,716,581 A * | 2/1998 | Tirrell et al. ................. 264/545 |
| 5,718,791 A | 2/1998 | Spengler |
| 5,723,155 A * | 3/1998 | Hayakawa et al. ......... 425/116 |
| 5,976,288 A | 11/1999 | Ekendahl |
| 6,136,415 A | 10/2000 | Spengler |
| 6,749,794 B1 | 6/2004 | Spengler |

FOREIGN PATENT DOCUMENTS

EP         0 450 482 A2     10/1991

(Continued)

*Primary Examiner*—Robert B. Davis
(74) *Attorney, Agent, or Firm*—W. F. Fasse; W. G. Fasse (57) ABSTRACT

A molding apparatus includes an upper mold tool having an upper-most mold half, a lower mold tool having a lowermost mold half, and an intermediate mold tool having a first auxiliary mold half cooperating with the uppermost mold half and a second auxiliary mold half cooperating with the lowermost mold half. In a first molding step, the intermediate mold tool is positioned between the upper and lower mold tools to form a first mold cavity between the upper and intermediate mold tools and a second mold cavity between the intermediate and lower mold tools. In this molding step upper and lower material layers are individually pre-molded in the two cavities. In a second molding step, the intermediate mold tool is moved laterally away, and the upper and lower mold tools are moved directly into molding cooperation with each other. Thereby, the separately pre-molded upper and lower material layers are brought together, laminated, bonded, and molded to produce a finished, two-layered molded component.

28 Claims, 9 Drawing Sheets

FOREIGN PATENT DOCUMENTS

| | | |
|---|---|---|
| EP | 0671259 | 9/1995 |
| FR | 2633810 A * | 1/1990 |
| JP | 62001528 A * | 1/1987 |
| JP | 62001529 A * | 1/1987 |
| JP | 63154312 A * | 6/1988 |
| JP | 63154313 A * | 6/1988 |
| JP | 04050553 A * | 2/1992 |

* cited by examiner

MOLDING METHOD AND APPARATUS WITH PLURAL COOPERATING MOLD TOOLS FOR FORMING INTERIOR TRIM COMPONENTS FOR MOTOR VEHICLES

PRIORITY CLAIM

This application is based on and claims the priority under 35 U.S.C. §119 of Czech Republic Patent Applications PV 2002-580 filed on Feb. 15, 2002, and PV 2002-2899 filed on Aug. 27, 2002, the entire disclosures of which are incorporated herein by reference.

1. Field of the Invention

The invention relates to a molding apparatus having at least two mold tools as well as a method for producing molded components having at least two layers, for example interior trim components for motor vehicles.

2. Background Information

Various methods and apparatus for forming molded interior trim components for motor vehicles are known in the art, for example as disclosed in U.S. Pat. No. 6,136,415. Such apparatus typically comprise forming or molding tools that each respectively include an upper mold half and a lower mold half, which cooperate with one another to mold or form the respective layers of the molded component that is to be produced therebetween. Generally, such apparatus further include additional machine components, such as, for example, a machine frame, various conventionally known drive arrangements, bearing and guiding components, as well as the necessary controls for opening and closing the mold tools.

It is known to make such molded and laminated components having plural layers, respectively made of materials that are three-dimensionally deformable and then thermoplastically bondable with each other, under the influence of temperature and pressure during the molding or forming process. Such a material is, for example, described in European Patent Publication EP 0,671,259.

Thus, it is known to produce motor vehicle interior trim components that comprise a carrier or supporting substrate layer of polyolefin fibers and natural fibers, as well as a decorative cover layer, and optionally further a foam layer, whereby these layers can be molded or formed, laminated, and bonded to each other in a single work cycle of the molding process, whereby this is achieved without requiring additional chemical bonding agents or adhesives. However, the material layers often must be individually pre-molded before being bonded together and finally molded in the conventional molding apparatus. In the prior art, such pre-molding steps typically must be carried out in a separate pre-molding apparatus.

The above discussed known methods and apparatus for forming such molded components, as well as the materials used for the laminated molded components have been found to be generally and substantially satisfactory for achieving their intended purposes. Nonetheless, it is desirable to increase the production speed and the production safety, so that a greater number of finished molded components can be produced per unit time. It is also desirable to further simplify the operations for carrying out the work cycle of the molding process, and to make the overall molding equipment more compact.

SUMMARY OF THE INVENTION

The above objects have been achieved in a molding apparatus according to the invention, having plural cooperating mold tools, whereby the respective mold halves of each one of the mold tools are arranged vertically aligned, one over another. Moreover, the respective mold halves are movable relative to one another in the vertical direction for opening and closing the respective mold tools. Also, the lower mold half of the upper mold tool and the upper mold half of the lower mold tool are movable in a direction perpendicular to the primary motion direction of the mold tools for opening and closing the mold tools. For example, the lower mold half of the upper mold tool and the upper mold half of the lower mold tool can selectively be moved in a horizontal or lateral direction out of the vertically aligned stack of the other mold tool components. Furthermore, the upper mold half of the upper mold tool and the lower mold half of the lower mold tool are moved vertically relative to one another in order to selectively open and close the upper mold half of the upper mold tool directly with respect to the lower mold half of the lower mold tool.

In the above discussed manner, the lower mold half of the upper mold tool and the upper mold half of the lower mold tool together form a selectively deployable intermediate mold tool that can be either moved into a working position between the upper mold half of the upper mold tool and the lower mold half of the lower mold tool, or moved laterally away and clear from this working position into an idle position so that the upper mold half of the upper mold tool and the lower mold half of the lower mold tool can be moved vertically toward one another to cooperate directly with each other. In a first operating condition with the intermediate mold tool located in the working position between the upper mold half of the upper mold tool and the lower mold half of the lower mold tool, two separate pre-molding cavities are formed within the molding apparatus, namely an upper or first pre-molding cavity between the upper mold half of the upper mold tool and the lower mold half of the upper mold tool, and a lower or second pre-molding cavity between the upper mold half of the lower mold tool and the lower mold half of the lower mold tool. These two pre-molding cavities may exert or exhibit different molding properties, for example different mold contours, different mold temperatures or the like, relative to each other and relative to the final molding cavity formed between the upper mold half of the upper mold tool and the lower mold half of the lower mold tool as discussed below. For example, the mold contour of the lower mold half of the upper mold tool does not have to correspond to the mold contour of the Lower mold half of the lower mold tool, and the mold contour of the upper mold half of the lower mold tool does not have to correspond to the mold contour of the upper mold half of the upper mold tool.

With the above described features of the inventive apparatus, it is possible to carry out rapid or short molding work cycles. Namely, in a first molding step, an upper layer of a two-layered component that is to be produced is pre-molded between the upper and lower mold halves of the upper mold tool, while simultaneously, the lower layer of the two-layered component is pre-molded between the two mold halves of the lower mold tool. Then, the mold tools are opened, while the upper material layer remains held in the upper mold half of the upper mold tool and the lower material layer remains held in the lower mold half of the lower mold tool. At this point, the intermediate mold tool, i.e. including the lower mold half of the upper mold tool and the upper mold half of the lower mold tool, is moved horizontally or laterally out of the working position that is vertically aligned with the upper mold half of the upper mold tool and the lower mold half of the lower mold tool. Next, in a second molding step, the upper mold half of the upper mold tool and the lower mold half of the lower mold tool are moved relative to each other into direct molding cooperation with one another to enclose a final molding cavity therebetween, whereby a final molding, lamination, and bonding-together of the upper material layer and the lower material layer of the molded component to be produced is carried out directly between the upper mold half of the upper mold tool and the lower mold half of the lower mold tool.

There is no need for the partially pre-molded layers to be transported or repositioned between the first molding step and the second molding step. It is simply necessary for the intermediate mold tool to move horizontally out of the way, and then for the upper mold half of the upper mold tool and the lower mold half of the lower mold tool to move relatively vertically toward one another. The overall molding cycle is thus carried out rapidly without loss of time between the molding steps, especially because the working stroke and travel or displacement distances of the various parts, and the process times necessary therefor are relatively short. The process and the control thereof are thus also relatively simple and trouble-free. Also, the entire molding cycle can be carried out rapidly enough, so that the thermal energy stored in at least one of the material layers, which has been preheated, is sufficient to carry out the thermoplastic melt-bonding process with the other material layer, without requiring the provision of additional heat energy from heaters or the like.

According to further particular features of the invention, at least one or both of the upper mold halves are additionally equipped with devices for accurately processing or finishing the outer contour of the edge of the respective material layer during the molding thereof. These devices are, for example, preferably stamping knives or other cutting devices.

In this regard it is further suitable and advantageous, if a material layer of the molded component being produced, which layer serves as a decorative cover layer is processed in such a manner so that it reaches around and covers the edges or rim of another material layer serving as a supporting substrate. For example, the devices provided on the upper mold halves in this regard may be any conventionally known edge-folding devices that are used for folding a large surfacial sheet material around the edges or rim of a smaller surfacial part.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
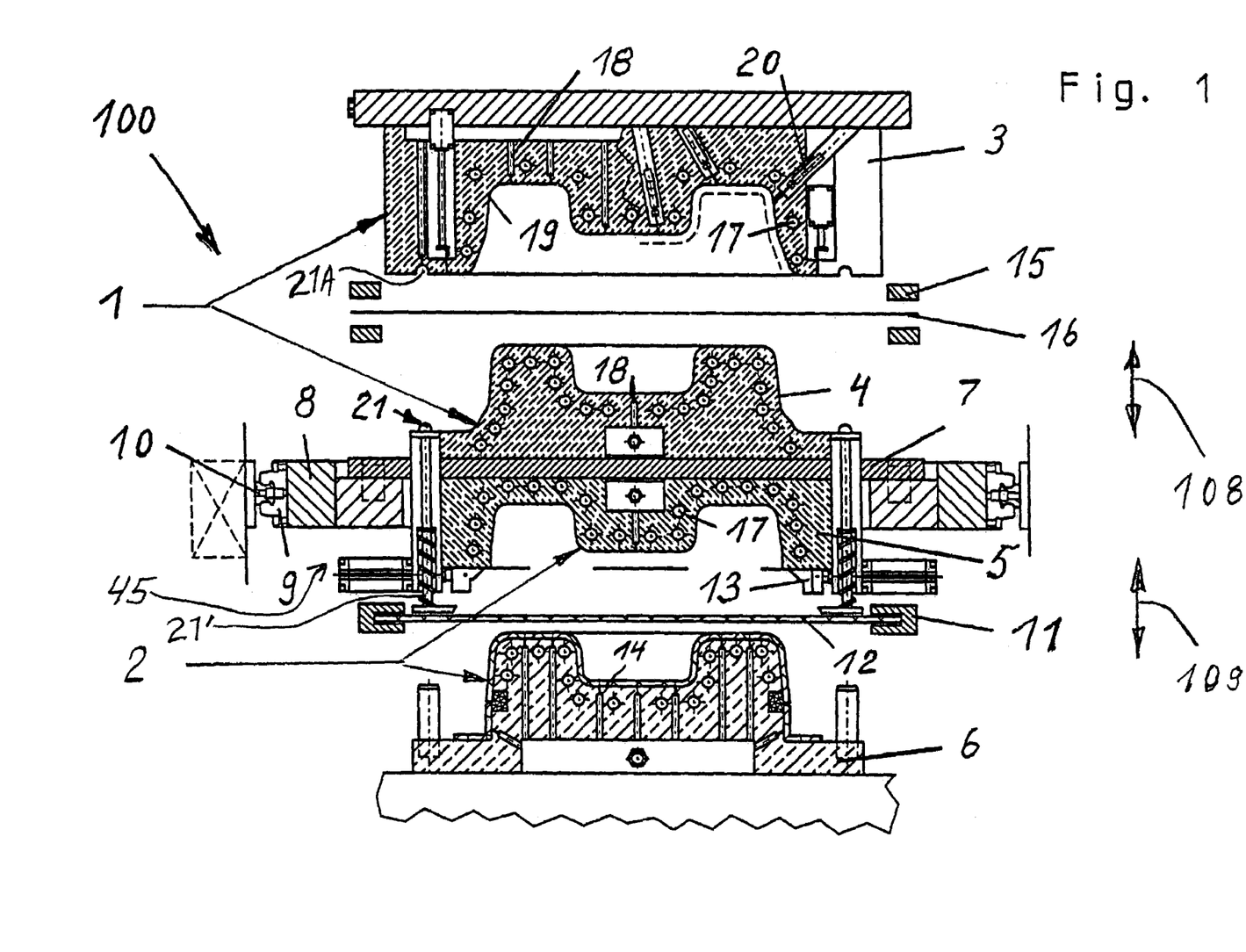
FIG. 1 is a schematic partial sectional view of the principle parts of the apparatus according to the invention, with the respective mold halves arranged in a first condition and an open position before closing the upper and lower mold tools.
Figure 2:
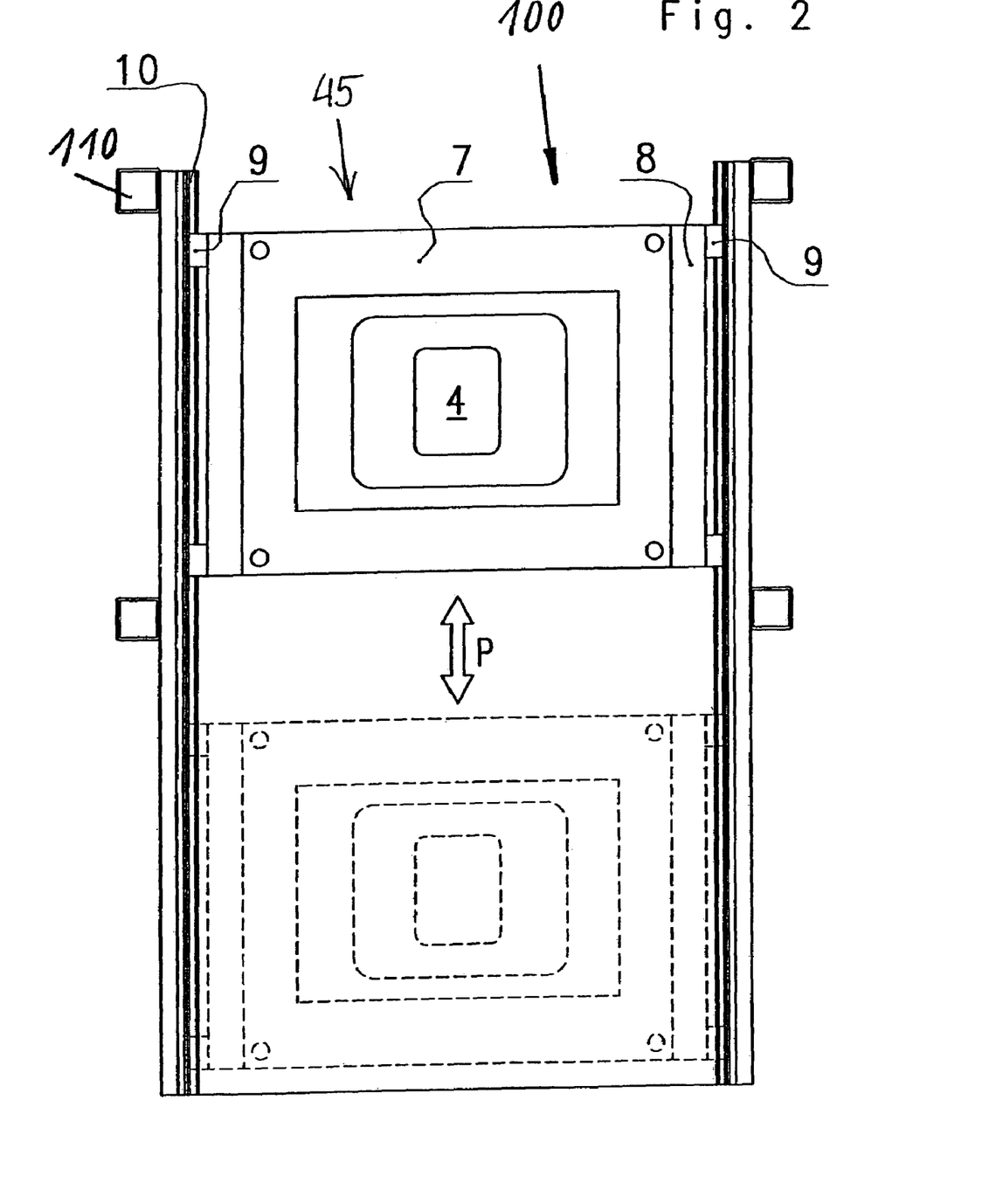
FIG. 2 is a schematic plan view of the intermediate mold tool formed by the lower mold half of the upper mold tool and the upper mold half of the lower mold tool, of the apparatus illustrated in FIG. 1.
Figure 3:
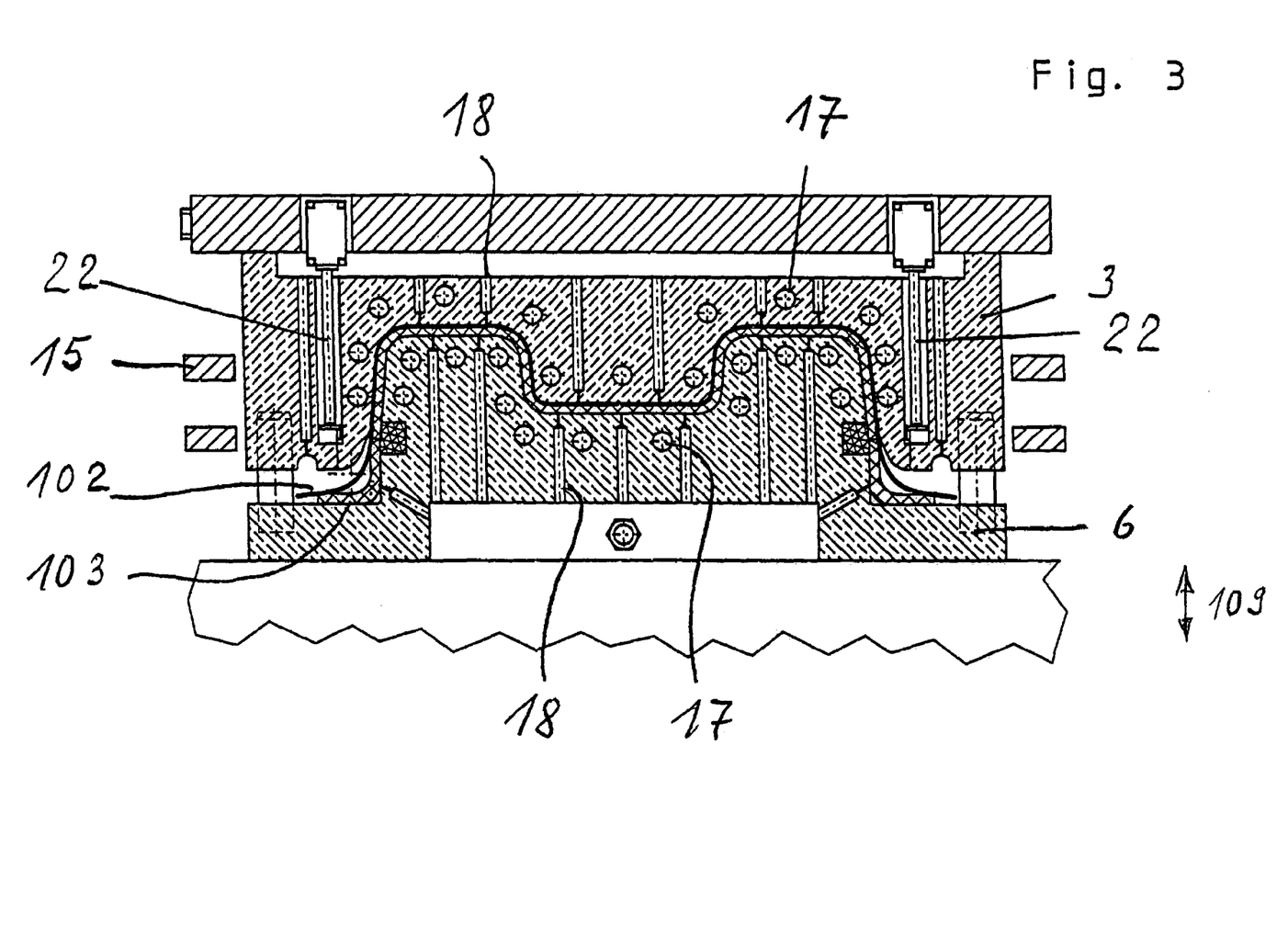
FIG. 3 is a schematic partial sectional view of the molding apparatus according to FIG. 1, on a slightly larger scale, and in the second operating condition with the intermediate mold tool removed, and the upper mold half of the upper mold tool closed directly against the lower mold half of the lower mold tool.

In the embodiment according to FIGS. 1 to 3, an apparatus 100 is provided for producing a molded component 101 (see also FIG. 8) that includes at least two layers 102, 103. The apparatus 100 includes an upper mold tool 1 and a lower mold tool 2, as the primary components that are principally of interest herein. Each of the two mold tools 1 and 2 respectively in turn comprises two mold halves, whereby the upper mold tool 1 comprises an upper mold half 3 and a lower mold half 4, and the lower mold tool 2 comprises an upper mold half 5 and a lower mold half 6.

The respective mold halves 3 and 4 as well as 5 and 6 of the two mold tools 1 and 2 are arranged aligned with one another, i.e. substantially vertically one above another, in a machine frame 110 shown in FIG. 2. The apparatus 100 further comprises any conventionally known drive arrangements and bearing, support and guide elements for the mold halves of the mold tools 1 and 2, as well as a conventionally known control for controlling the drives, and further any other conventionally known components and systems so that the mold tools 1 and 2, or rather particularly their respective mold halves 3, 4, 5 and 6, can be moved relative to one another, i.e. toward and away from each other so as to functionally close and open the mold as indicated by the double arrows 108 and 109 in FIGS. 1 and 3. Throughout this application, references to mold halves moving "relative to one another" or the like, mean that at least any one (but possibly several or even all) of the mold halves is movable, so as to bring about a relative motion among the mold halves.

The lower mold half 4 of the upper mold tool 1 and the upper mold half 5 of the lower mold tool 2 are rigidly connected with each other in this embodiment, and are thus movable in common together with each other. These two mold halves 4 and 5 may be called first and second auxiliary mold halves 4 and 5, and together form an intermediate mold tool 45 that can be brought selectively into or out of cooperation with the upper mold tool 1 and the lower mold tool 2. In this regard, the two mold halves 4 and 5 are arranged and supported on a plate-shaped carrier element 7. A frame 8 supports the carrier element 7 and therewith the two mold halves 4 and 5, and enables the cross-wise or preferably horizontal transport of the intermediate mold tool 45. Furthermore, the frame 8 supports the carrier element 7 and the mold halves 4 and 5 in an unrestrained or releasable manner, while allowing a vertical movement of the two mold halves 4 and 5 making up the intermediate mold tool 45.

The carrier element 7 or the frame 8 is further equipped with rollers 9 or slide blocks or the like, with which the intermediate mold tool 45 including the mold halves 4 and 5 can roll or slide along rails 10 in a reciprocating horizontal direction P as shown by the double-headed arrow in FIG. 2. This motion will carry the intermediate mold tool 45 into either a first working position in which the mold halves 4 and 5 are arranged vertically aligned with the other mold halves 3 and 6 as shown in FIG. 1, or a second inactive or idle position as shown in FIG. 2, in which the mold halves 4 and 5 are clear and away from the other mold halves 3 and 6, so that the upper mold half 3 of the upper mold tool 1 and the lower mold half 6 of the lower mold tool 2 can cooperate directly with each other (without the intermediate mold tool 45 therebetween) as shown in FIG. 3. The length of the rails 10 and the travel or displacement distance for the two rigidly interconnected mold halves 4 and 5 forming the intermediate mold tool 45 is selected so that the two mold halves 4 and 5 can be moved at least entirely out of or clear from the working range of the two mold halves 3 and 6 that are movable relative to one another in the vertical direction in the second condition as shown in FIG. 3, and also to allow the mold halves 4 and 5 to be moved into the first working position in the first condition for cooperating with the other mold halves 3 and 6 as shown in FIG. 1. Particularly, the working position of the mold halves 4 and 5, i.e. the intermediate mold tool 45, is shown with solid lines in FIG. 2, while the second idle or parking position thereof is shown by dashed lines in FIG. 2.

The molded component 101 that is to be produced using the apparatus 100 comprises at least two layers, e.g. an upper layer 102 and a lower layer 103 (see FIG. 8), which will be pre-fabricated and pre-molded in the apparatus 100 and then laminated together and finally molded into the finished three-dimensionally contoured configuration of the molded component 101, also using the apparatus 100. In this regard, a respective surfacially extending sheet-like layer of a raw starting material 12 or 16 is provided, whereby these materials are three-dimensionally moldable or formable under the influence of heat and pressure. Thereby, in the process of manufacturing the molded component 101, e.g. an interior trim component for a motor vehicle, the surfacial sheet-like starting material 12 forms the lower layer 103 serving as the supporting substrate of the molded component 101. This supporting substrate layer 103 will provide the necessary strength, form stability, and stiffness of the final three-dimensionally molded and contoured, form stable end product, i.e. the molded component 101. On the other hand, the other surfacially extending sheet-like starting material 16 will form a cover layer or decorative layer 102 of the finished molded component 101.

As can be seen in FIG. 1, the sheet or layer of starting material 12 for forming the supporting substrate layer 103 is carried by a tentering or carrying device such as a carrier frame 11, between the upper mold half 5 and the lower mold half 6 of the open, lower mold tool 2. Similarly, the starting material 16 serving to form the decorative cover layer 102 is carried by a tentering and carrying device such as a carrier frame 15, between the upper mold half 3 and the lower mold half 4 of the upper mold tool 1. This establishes a first molding state or condition, in which the molding apparatus 100 is ready to carry out a first molding step or stroke, as shown in FIG. 1.

For carrying out the molding process, it should be further understood that the mold halves 3 to 6 are additionally equipped with any other conventionally known devices and features for processing the starting material layers and the molded component. Elements 13 or 22, such as stamp cutting blades or trimming knives, for example, can be provided on the mold halves for forming the accurate intended contour of the outer edge of the starting materials 12 and 16 as these materials are processed separately in the mold tools 1 and 2 for forming the layers 103 and 102. The mold halves 3 to 6 further preferably include passages or channels 17 therein, through which heated, cooled or generally appropriately tempered fluid medium may be provided for heating or cooling the mold halves 3 to 6 as necessary before, during, or after the molding process. Bored holes or openings 18 are provided in the upper mold half 3 of the upper mold tool 1, and pass therethrough to end and open on the inner contour surface 19 of this mold half 3. The bored holes 18 may be connected to a reduced pressure or vacuum generator (not shown) for suction-holding the material 16, or for vacuum-assisting the molding process. Alternatively, the bored holes 18 can receive holding needles 20 therein for holding the respective part being formed in the mold tool 1.

It is suitable in this embodiment, if the mold half 3 is rigidly arranged in the apparatus 100, e.g. rigidly connected to the machine frame 110, while the other three mold halves 4, 5 and 6 are vertically movable toward or away from the uppermost mold half 3. In this regard, the other mold halves 4, 5 and 6 move vertically upward to close the mold tools 1 and 2, or move vertically downward to open the mold tools 1 and 2. The open position is shown in FIG. 1. The closed position is not shown in the figures. Nonetheless, it can be readily understood, that when the mold tools 1 and 2 close, the material layers 16 and 12 respectively located between the mold halves 3 and 4 and the mold halves 5 and 6 will be deformed or molded in the desired manner. It should further be understood that the motion in this regard can be provided solely by driving the lowermost mold half 6 with a suitable stroke drive, such as a hydraulic piston cylinder arrangement (not shown in FIGS. 1 and 3). The intermediate mold tool 45 including the mold halves 4 and 5 moves passively, for example under spring support via a spring support mechanism 21', as it is contacted and lifted by the mold half 6 being pushed upward toward the uppermost mold half 3. Then, alignment protrusions 21 of the auxiliary mold half 4 contact and engage with alignment recesses 21A of the uppermost mold half 3, to ensure that the mold half 4 properly seats and registers against the mold half 3.

This first press molding step in the condition shown in FIG. 1, when the mold is pressed closed, serves to pre-compress and pre-mold or shape the material layers 12 and 16 to form the individual layers 103 and 102 that will later be united to become the finished molded component 101. It should be noted, that this first molding step can involve a different molding contour or molding pressure than that required for the final molding of the molded component 101, because the mold halves 4 and 5 of the intermediate mold 45 are used in this first molding step, but are not used in the second molding step that will be described below. As an example, in this first molding step the two layers 102 and 103 can each respectively be pre-molded and pre-compressed with a uniform thickness or with a "parallel" contour on both surfaces of each layer, while in the second molding step, there may be respective different areas of differing thickness of the finished molded component 101. This is merely an example, because any desired mold contours can be provided respectively on each one of the mold halves.

Once the first molding step is completed, the mold tools 1 and 2 are opened, and then the rigidly interconnected auxiliary mold halves 4 and 5 forming the intermediate mold tool 45 are moved out of the working position shown in FIG. 1 into the parking position according to FIG. 2. The upper layer 102 that will form the decorative cover layer remains held in the upper mold half 3 of the upper mold tool 1 when the mold tool is opened. This can be achieved, for example, either by applying a reduced pressure or vacuum point-wise through the bored holes 18 on the inner contour 19 of the upper mold half 3, or by means of holding needles 20 provided at these locations. The originally flat layer of starting material 12 has been three-dimensionally pre-molded or formed into the molded part 14 as shown in FIG. 1, to become the lower layer 103 serving as a supporting substrate of the finished molded component 101. This three-dimensionally pre-molded part 14 has been pre-heated in any conventionally known manner before being molded, and still retains sufficient internal heat for the thermoforming and thermo-bonding processes that will be described below. At this time, the hot pre-molded part 14 remains on the lower mold half 6 of the lower mold tool 2, either simply by gravity or by similar means as described above with regard to the uppermost mold half 3.

Next, after the intermediate mold tool 45 with the mold halves 4 and 5 has been moved out of the way into the parking station, the lower mold half 6 is moved upwardly toward and into direct molding cooperation with the upper mold half 3 of the upper mold tool 1, i.e. in the condition shown in FIG. 3. Thereby, the two pre-molded layers 102 and 103 respectively carried on the uppermost mold half 3 and the lowermost mold half 6 have been pressed, laminated and bonded surfacially to one another, whereby the heat of the substrate layer 103 causes the at least partial melting of a plastic component of the upper layer 102, so that the two layers 102 and 103 are thermoplastically bonded to each other. The two layers are further three-dimensionally molded into the final desired contour of the finished molded component 101. The hot molded component also cools sufficiently in the cooled or tempered mold halves, to a sufficiently low temperature that it is thermoplastically fixed, and then the two mold halves 3 and 6 are again opened. Then, the finished molded component 101 can be removed from the open mold.

Figure 8:
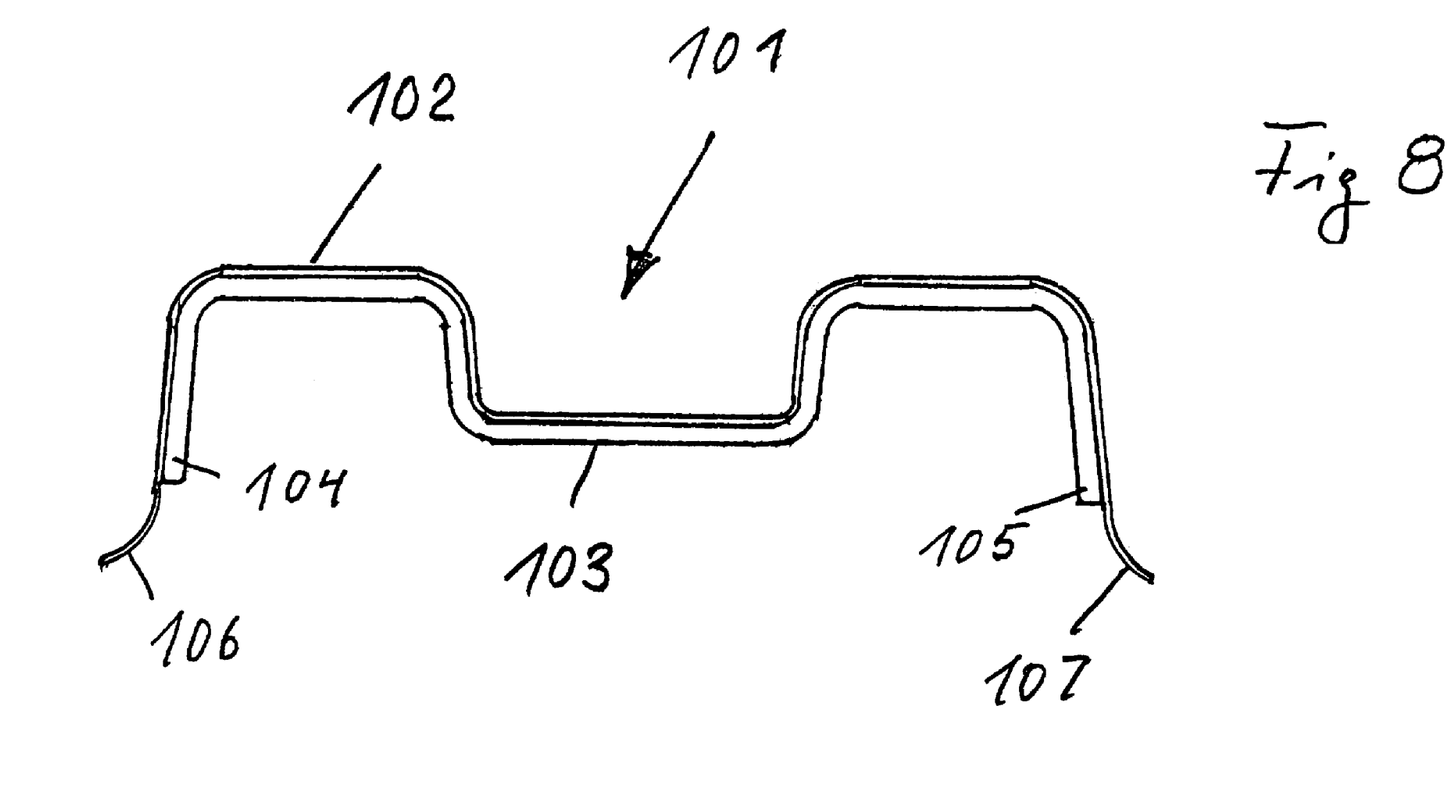
FIG. 8 is a schematic sectional view of a two-layered three-dimensionally molded component, such as a molded interior trim component for a motor vehicle, for example.

According to FIG. 8, the layers 102 and 103 forming the multi-layered molded component 101 respectively comprise differing rims or edges 104 and 105 (for the layer 103) and 106 and 107 (for the layer 102). The form or shape of the edges 106 and 107 of the layer 102 is selected, e.g. large enough, so that they can be folded or wrapped around the free ends of the edges 104 and 105 of the layer 103 in a further edge-folding step. The necessary shape and configuration of the two layers 102 and 103 is already achieved in the apparatus 100 with the respective suitable elements 13 and 22 provided respectively in the upper mold halves 3 and 5 of the mold tools 1 and 2 for processing these edges of the layers. For example, the elements 13 and 22 are stamping knives that embody a stamp-cutting arrangement, or any other conventionally known cutting or separating elements or devices.

Both molding tools 1 and 2 further comprise elements for sealing the mold halves 3 and 4, the mold halves 5 and 6, and the mold halves 3 and 6, which respectively cooperate with each other. These sealing elements or arrangements are especially important in cases in which the starting materials 12 or 16 are air permeable.

Figure 4:
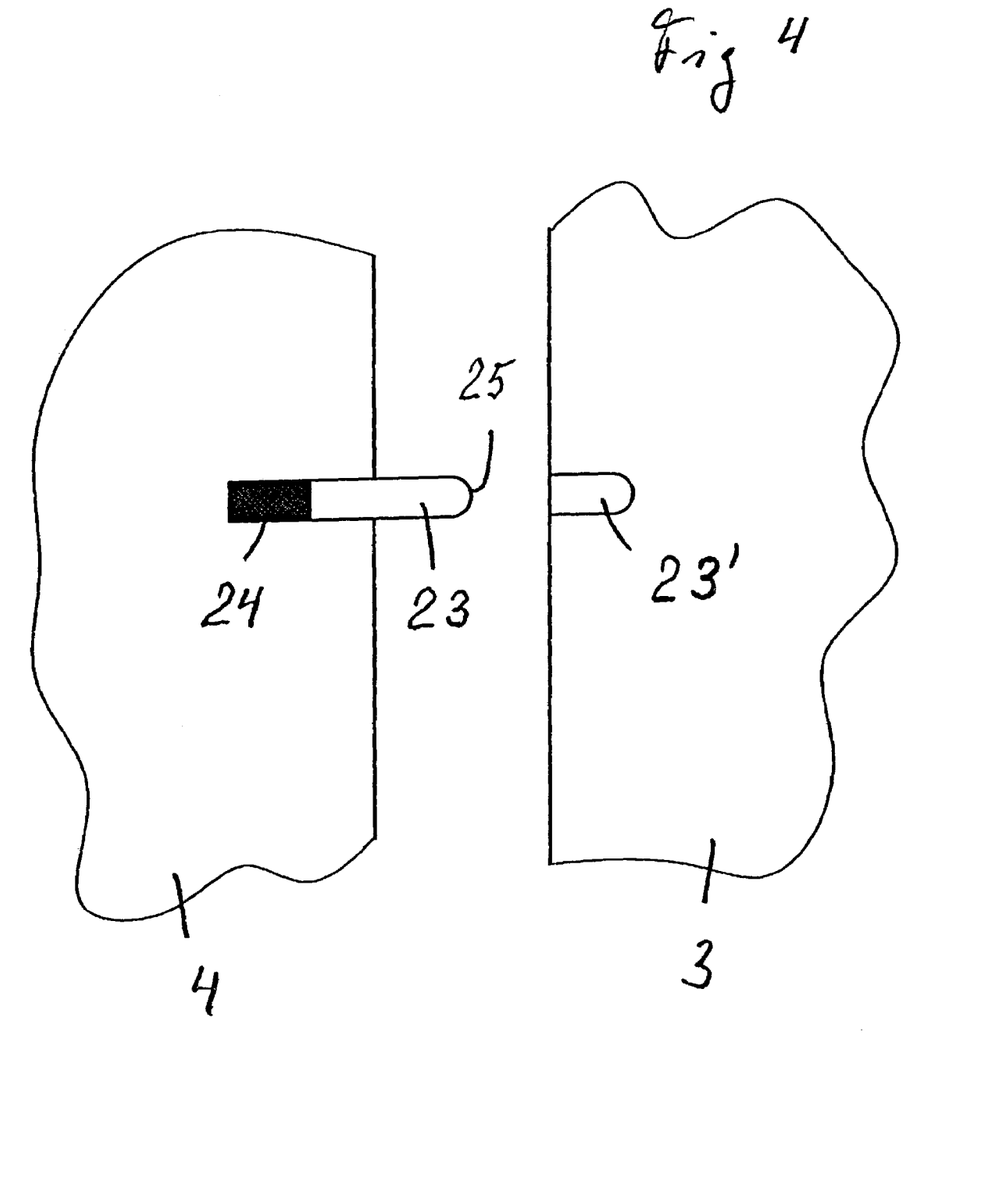
FIG. 4 is a schematic sketch showing the principles of seal elements of a first embodiment for sealing the mold tools.

According to the general example embodiments schematically shown in FIG. 4, one mold half, e.g. the mold half 3, includes a seal gap or groove 23' serving as a first seal element, while the surface of the other mold half 4 comprises a seal bar or strip 23 protruding therefrom as a second seal element to cooperate with the seal gap or groove 23'. The seal bar or strip 23 may, for example, be supported in the mold half 4 in a spring-elastic yielding manner. To achieve this, a yielding or springy element, such as a rubber member 24 for example, or the like, is provided to elastically bias the seal bar 23. In order to achieve a good sealing function, it is further suitable that the seal gap or groove 23' receives the free edge 25 of the seal bar 23 in a form-fitting manner in the closed and sealed position.

Figures 5, 6:
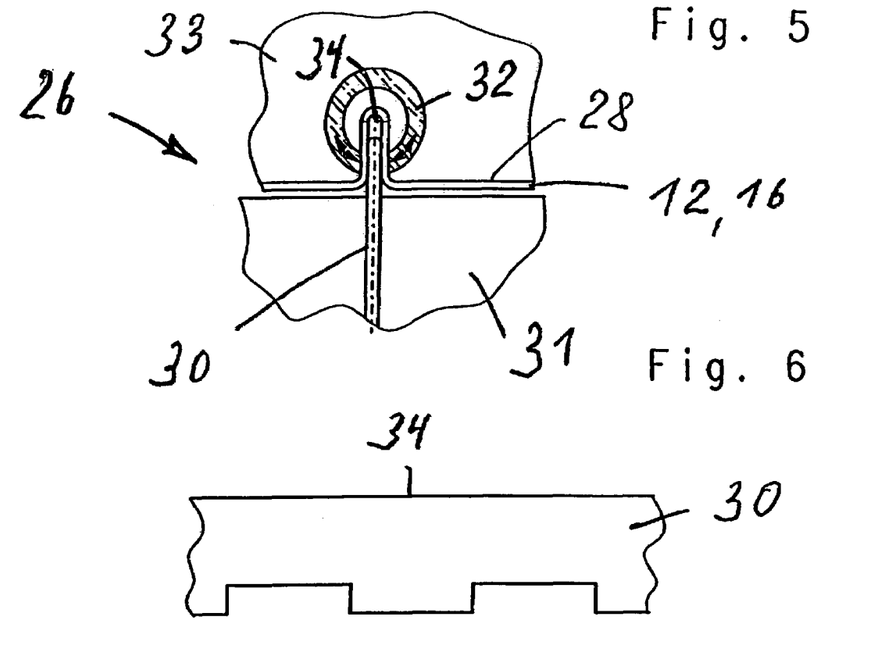
FIG. 5 is a schematic sectional view of a different embodiment of a seal arrangement with a clamping bar or strip that serves to seal especially air-permeable materials in the mold in the closed position.
FIG. 6 is a schematic broken-away side view of a knife or blade-shaped seal element for the clamping bar or strip according to FIG. 5.
Figure 7:
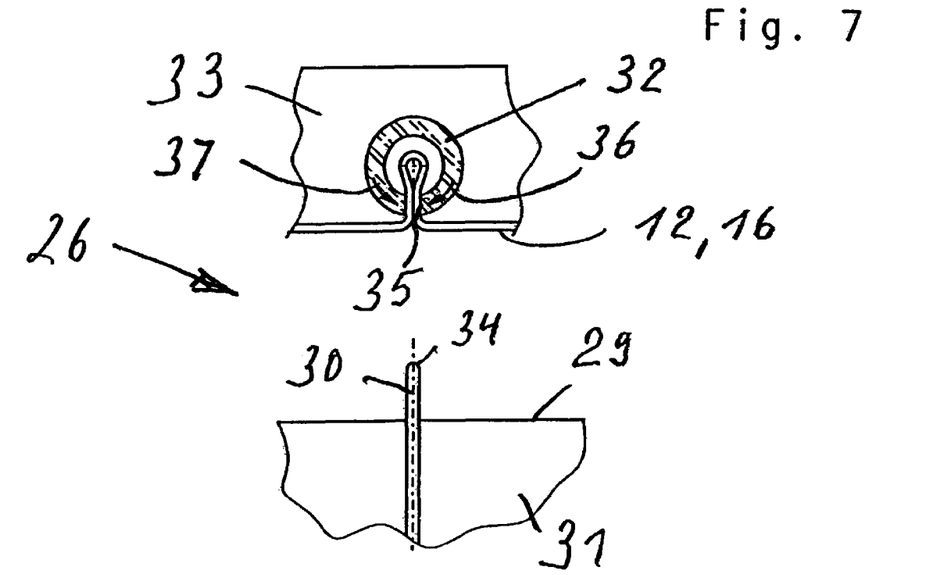
FIG. 7 is a schematic sectional view of the seal arrangement of FIG. 5, showing the clamping bar and its seal element in the separated or opened condition.

According to FIGS. 5 to 7, a further seal arrangement 26 for the mold tools of the pertinent type similarly comprises a seal bar or strip 30, which is arranged in one or the other of the mutually facing surfaces 28 and 29 of the one or the other mold half.

In the present example embodiment, the seal bar 30 is arranged rigidly in the mold half 31, rather than being spring-mounted or elastically mounted. Furthermore, a clamping bar or strip 32 is provided in the other mold half 33 to cooperate with the seal bar or strip 30 in the first mold half 31. Such a seal arrangement 26 is especially utilized if the starting material 12 or 16 that is to be processed is air permeable.

Upon closing the seal arrangement 26, which occurs as a consequence of closing the respective mold halves relative to each other, the seal bar 30 penetrates with its free edge or rim 34 into the clamping bar 32, which, for example, has a ring-shaped cross-section in the example embodiment shown in FIG. 5. The clamping bar 32 is slit open along its length and is made of a spring-elastic material. Upon penetrating into the clamping bar 32, the free edge 34 of the seal bar 30 simultaneously pushes and tucks the layer of starting material 12 or 16 into the pipe or tube-shaped clamping bar 32, namely through the open entrance and exit slit 35 along the length thereof. Due to the spring elastic characteristics of the clamping bar 32, the edges thereof bounding the entrance and exit slit 35 have a tendency to press together, i.e. toward one another as shown by the arrows 36 and 37 in FIG. 7. Thereby, a complete and tight seal is achieved, even if the starting material 12 or 16 is air permeable. This is true both when the free edge 34 of the seal bar 30 is still positioned together with a fold of the starting material 12 or 16 in the inside of the clamping bar 32, as well as when only the fold of the starting material 12 or 16 remains in the inside of the clamping bar 32, as respectively shown in FIGS. 5 and 7. In this regard, the seal bar 30 is suitably in the form of a tucking blade or the like, and may suitably be made of a metal material.

Upon arranging or supplying the starting materials 12 and 16 into the respective pre-molding cavities formed in the molding apparatus 100, the mold halves 3, 4, 5 and 6 respectively are located in four different planes that are vertically stacked one above another. The starting material 12 and/or the starting material 16 may already previously have been preheated in the required manner outside of the apparatus 100, so that the materials located between the mold halves will have the required working temperature, for example in a working temperature range between 160° C. and 220° C. The introduction of heat energy to the materials 12 and/or 16 to ensure the required working temperature can further be supported by flowing properly heated or tempered water or oil through the passages or channels 17 in the respective mold halves.

The material for the supporting substrate layer 12, 103 may advantageously be a web or a mat material of polypropylene fibers and natural fibers, or of polypropylene fibers and glass fibers, or of polypropylene fibers and cellulose fibers. The decorative cover sheet layer 16, 102 may advantageously consist of thermoplastic materials in the form of films, woven textiles, or nonwoven textiles, and may additionally be pre-laminated with synthetic foam backings.

Figure 9:
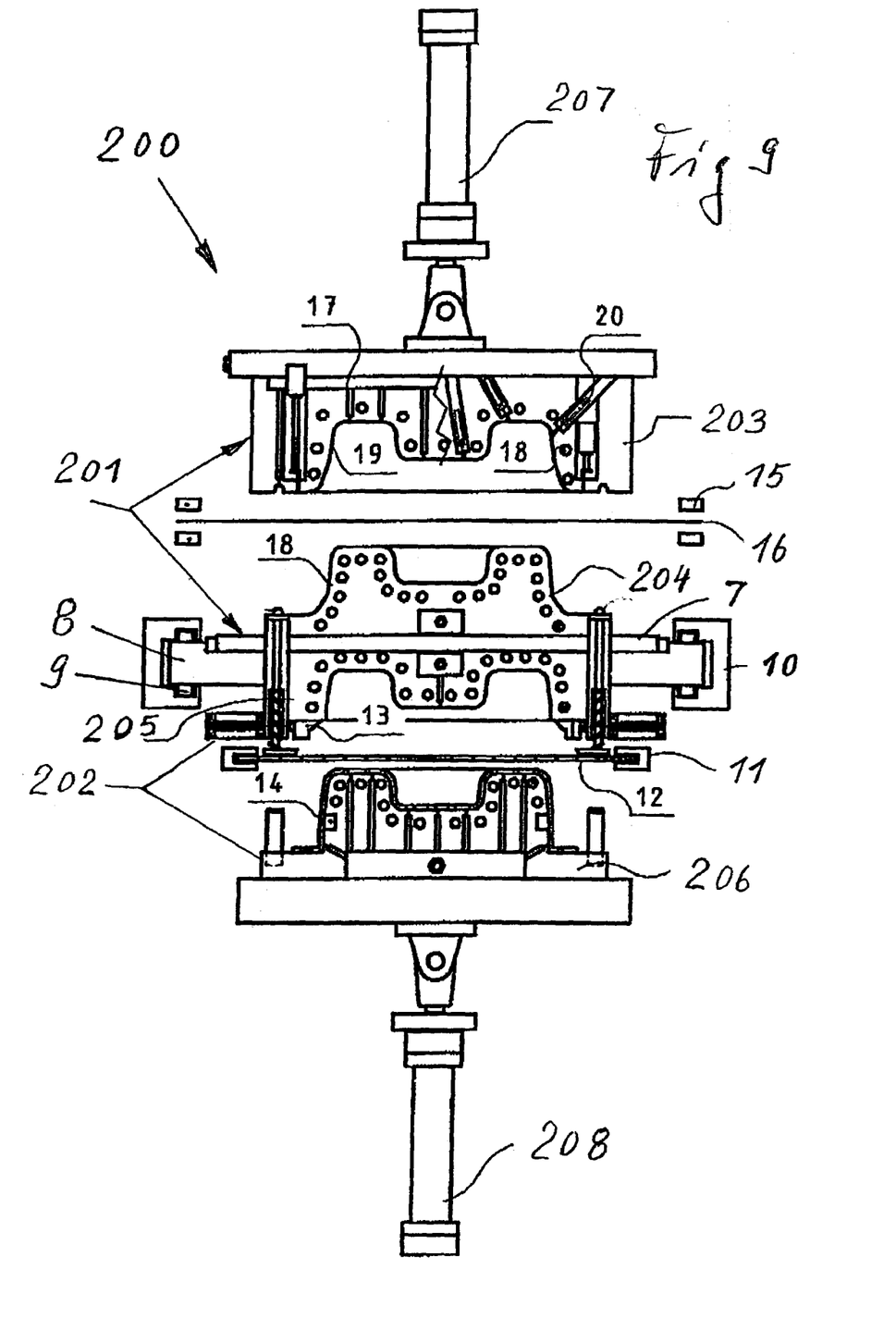
FIG. 9 is a schematic partial sectional view similar to that of FIG. 1, but showing an alternative second embodiment of an apparatus according to the invention.
Figure 10:
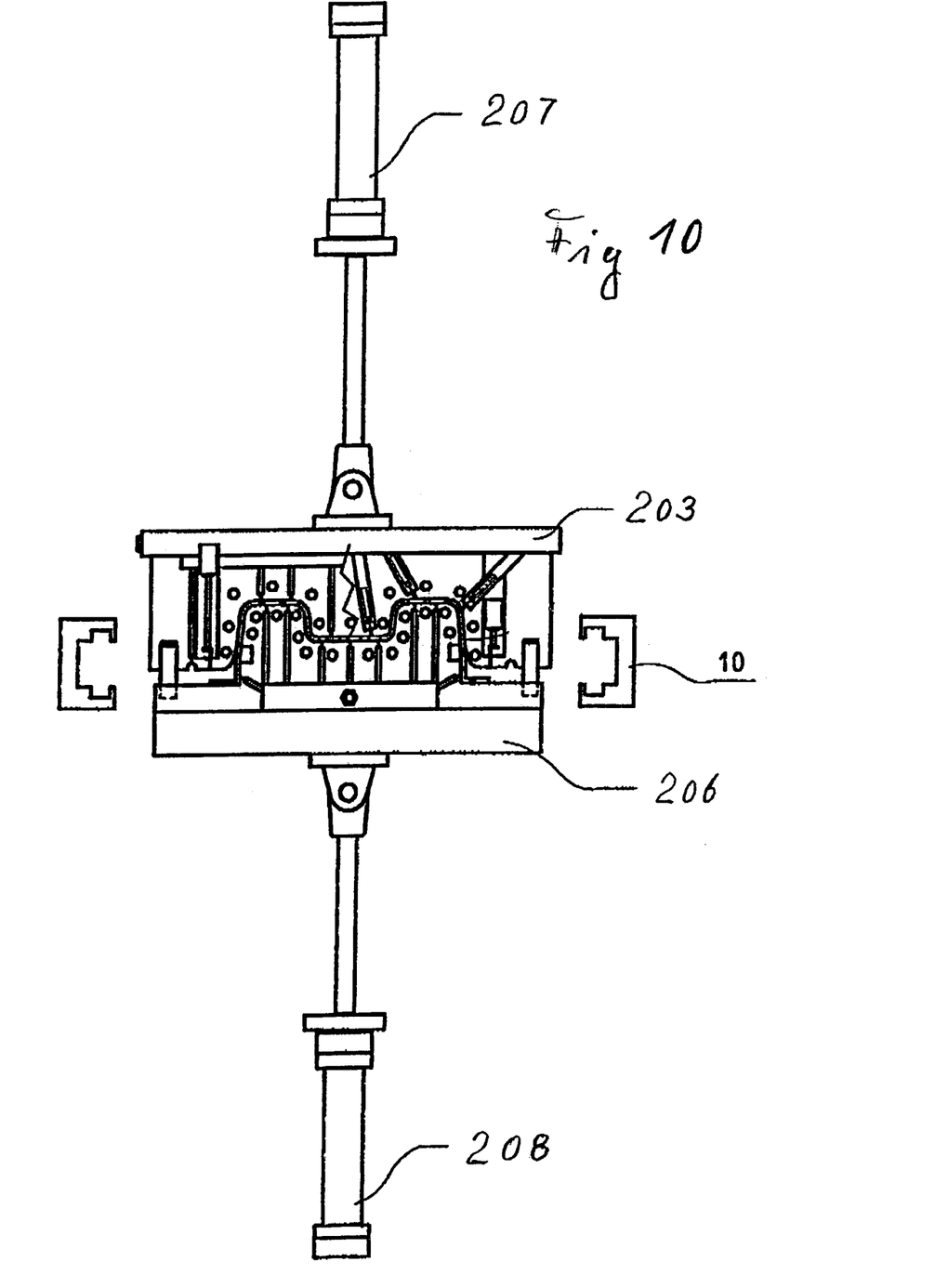
FIG. 10 is a schematic partial sectional view similar to that of FIG. 3, but showing the alternative second embodiment of the apparatus according to FIG. 9, in the closed position with the intermediate mold tool moved out of the way.

The alternative embodiment of an apparatus 200 shown partially and schematically in FIGS. 9 and 10 comprises basically the same major machine components and parts as the above described apparatus 100 according to FIGS. 1 to 3. For producing a two-layered molded component 101 (see e.g. FIG. 8), the apparatus 200 thus similarly comprises an upper mold tool 201 and a lower mold tool 202, which each respectively include upper and lower mold halves 203 and 204 or 205 and 206. All other components described in connection with the apparatus 100 are also present and provided with the same reference numbers in the apparatus 200 shown in FIGS. 9 and 10.

One difference between the apparatus 100 and the apparatus 200 is that the upper mold half 203 of the upper mold tool 201 is movably arranged relative to the machine frame, and is provided with its own independent lifting or stroke drive 207, while the lower mold half 206 of the lower mold tool 202 also has its own independent lifting or stroke drive 208. In this embodiment, the intermediate mold tool 245 formed by the lower mold half 204 of the upper mold tool 201 and the upper mold half 205 of the lower mold tool 202 can be arranged on a fixed horizontal plane, i.e. without being movable in the vertical direction. Instead, the upper mold half 203 is movable vertically by means of its lifting or stroke drive 207, to be moved with the necessary molding pressure against the associated cooperating lower mold half 204, while the lower mold half 206 of the lower mold tool 202 is vertically movable with the necessary molding pressure by means of its lifting or stroke drive 208 against the upper mold half 205 of the lower mold tool 206. Thereby, the mold is closed from the position shown in FIG. 9 to a closed first condition. This mold closing is, of course, only carried out after the two layers 102 and 103 of the starting materials 16 and 12 have been positioned in the respective pre-molding cavities. By closing the mold in this condition as shown in FIG. 9, the two layers 102 and 103 are each respectively individually pre-molded and pre-compressed as discussed above.

Next, the two mold cavities are opened by lifting the uppermost mold half 203 and lowering the lowermost mold half 206, and then the two rigidly interconnected mold halves 204 and 205 forming the intermediate mold tool 245 are moved laterally out of the working space between the two other mold halves 203 and 206. Thereafter, these two mold halves 203 and 206 are driven vertically toward and into direct molding cooperation with each other using the stroke drives 207 and 208, into the closed second condition shown in FIG. 10.

Thus, similarly as described above in the first embodiment, the second embodiment of the apparatus 200 also includes two molding steps. In the first molding step, the uppermost mold half 203 of the upper mold tool 201 cooperates with the mold half 204 to form a first pre-molding cavity therebetween, while simultaneously the lowermost mold half 206 cooperates with the mold half 205 to form a second pre-molding cavity therebetween. Then, in the second molding step, the mold halves 204 and 205 have been moved out of the working position into the parking or idle position, so that the uppermost mold half 203 cooperates directly with the lowermost mold half 206 in this second molding step, so as to laminate, bond together, and finally mold the two layers 12, 103 and 16, 102 therebetween.

The additional provision of two independent lifting or stroke drives 207 and 208 for the two mold halves 203 and 206 achieves several advantages in comparison to the above described first embodiment. For example, in this second embodiment, it is not necessary that the two mold halves 204 and 205 forming the intermediate mold tool 245 need to be lifted out of the frame 8 equipped with rollers or slide blocks 9. Instead, as mentioned above, the intermediate mold tool 245 does not need to move in a vertical direction. Thus, despite the provision of a second stroke arrangement, the overall technical effort and complexity is reduced in the present second embodiment in comparison to the first embodiment which uses only a single stroke or lifting drive as shown in FIG. 1.

Figure 11:
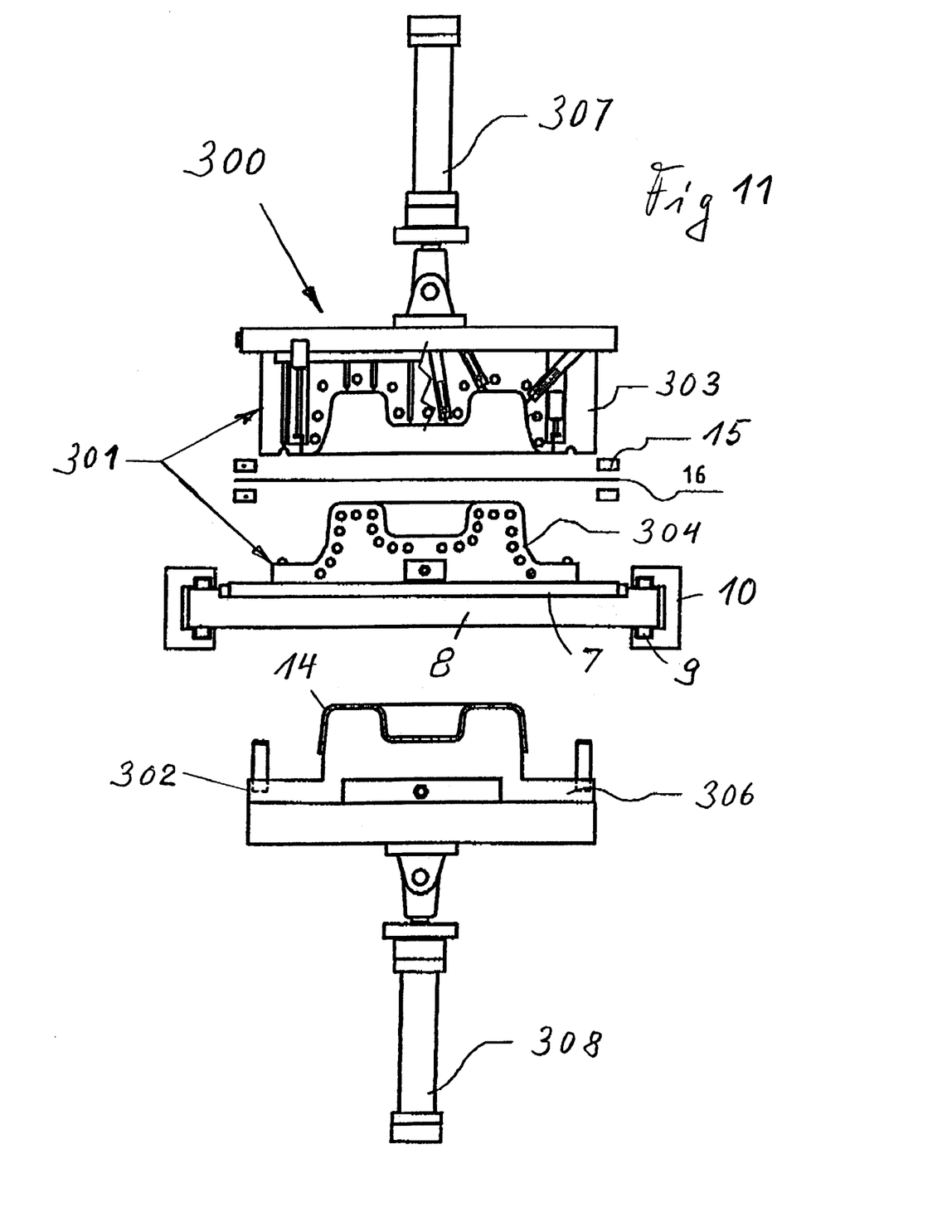
FIG. 11 is a schematic partial sectional view similar to that of FIG. 9, but showing a third varied embodiment of the molding apparatus according to the invention.

An apparatus 300 according to the third embodiment of the invention is shown schematically in FIG. 11, and comprises a complete upper mold tool 301 and an incomplete or partial lower mold tool 302. The complete upper mold tool 301 includes an upper mold half 303 and a lower mold half 304, similarly as in the above described first and second embodiments. While the lower mold tool 302 may comprise an upper mold half as described above, this is not absolutely necessary as seen in FIG. 11. Namely, according to the present example embodiment, the lower mold tool 302 includes only a lower mold half 306. The apparatus 300 further includes a stroke drive 307 engaging and driving the upper mold half 303 of the upper mold tool 301, and a second stroke drive 308 engaging and driving the mold half 306 of the lower mold tool 302.

The upper mold tool 301 in this embodiment is constructed and functions substantially like the upper mold half of the above discussed first and second embodiments to produce a surfacial, three-dimensionally molded layer 102 for the two-layered molded component 101 (see FIG. 8). In this context, a layer of starting material 16 is carried by a tentering and carrying arrangement 15 to form this upper layer 102. On the other hand, the material for the second or lower layer 103 of the two-layered molded component 101 is pre-molded to form a pre-fabricated substrate part 14 in a separate molding step using a separate molding apparatus which is not shown in the drawings. This prefabricated part 14 may additionally be treated or processed along its edges, for example being trimmed or cut to a precise edge contour. This prefabricated part 14 is simply laid onto the lowermost mold half 306 of the lower mold tool 302. This can take place either before or after the intermediate mold tool, i.e. the lower mold half 304 of the upper mold tool 301, has been moved laterally out of and away from the working space between the two mold halves 303 and 306. Then, the two mold halves 303 and 306 are respectively driven by the drives 307 and 308 to cooperate with one another so as to bring together, laminate, bond, and finally mold the pre-molded upper layer 102 and the separately prefabricated lower layer 103 to each other, in the same manner as has been described above for this second molding step in either of the first and second embodiments.

The prefabricated substrate part 14 may be placed onto the lower mold half 306 either with an automated handling device or entirely manually, i.e. by hand, if this is suitable in the individual application. This is especially applicable when the prefabricated part 14 has been suitably prefabricated on a separate apparatus, due to various different piece counts (e.g. a small number of pieces in a given production series), or due to particular or special material characteristics of the materials of the substrate part 14.

It should be understood that all of the drawings, and especially FIG. 11, are shown in a schematically simplified manner, whereby various machine components and auxiliary devices have been omitted for the sake of simplicity and clarity. All necessary components for the full functionality of the molding apparatus are provided, as can be understood from the conventional art.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A molding apparatus for forming a multi-layered molded component, comprising:
    a first mold tool including a first mold half;
    a second mold tool including a second mold half;
    an intermediate mold tool including a first auxiliary mold half and a second auxiliary mold half;
    a first carrier frame that is movably arranged between said first mold half and said first auxiliary mold half; and
    a second carrier frame that is movably arranged between said second mold half and said second auxiliary mold half;
    wherein:
    said first mold half is arranged facing and aligned with said second mold half;
    said first auxiliary mold half and said second auxiliary mold half are movably arranged so as to be movable between a working position in which said first auxiliary mold half and said second auxiliary mold half are respectively located aligned in a working space between said first mold half and said second mold half, and an idle position in which said first auxiliary mold half and said second auxiliary mold half are respectively located away from and clear of said working space;
    said first auxiliary mold half and said first mold half are respectively contoured to cooperate and mate with each other while enclosing a first pre-molding cavity therebetween;
    said second auxiliary mold half and said second mold half are respectively contoured to cooperate and mate with each other while enclosing a second pre-molding cavity therebetween;
    said first carrier frame is arranged and adapted to carry and hold in said first pre-molding cavity a first material layer to form a cover layer of the multi-layered molded component;
    said second carrier frame is arranged and adapted to carry and hold in said second pre-molding cavity a second material layer to form a supporting substrate layer of the multi-layered molded component;
    said first mold half and said second mold half are respectively contoured to cooperate and mate with each other while enclosing a final molding cavity therebetween; and
    at least one of said mold halves is movable to selectively open and close said first mold half relative to said first auxiliary mold half and to selectively open and close said second mold half relative to said second auxiliary mold half so as to selectively open and close said first pre-molding cavity and said second pre-molding cavity respectively in a first molding step when said first auxiliary mold half and said second auxiliary mold half are respectively located in said working position, and to selectively open and close said first mold half relative to said second mold half so as to selectively open and close said final molding cavity therebetween in a second molding step when said first auxiliary mold half and said second auxiliary mold half are respectively located in said idle position.

2. The molding apparatus according to claim 1, wherein said first mold half is an uppermost mold half arranged vertically above said second mold half, so that said first auxiliary mold half faces, cooperates with and mates with said uppermost mold half to enclose said first pre-molding cavity therebetween when said first auxiliary mold half is in said working position.

3. The molding apparatus according to claim 1, further comprising a machine frame, wherein said first mold tool further includes a first stroke drive connected to said first mold half to move said first mold half toward and away from said second mold half relative to said machine frame, and said second mold tool further includes a second stroke drive connected to said second mold half to move said second mold half toward and away from said first mold half relative to said machine frame.

4. The molding apparatus according to claim 1, wherein said intermediate mold tool does not include a stroke drive to move said intermediate mold tool toward and away from said first mold half, and said intermediate mold tool remains at a fixed plane between said first and second mold tools relative to said machine frame.

5. The molding apparatus according to claim 1, wherein said first auxiliary mold half and said second auxiliary mold half are arranged back-to-back and are rigidly connected to each other.

6. The molding apparatus according to claim 1, wherein said intermediate mold tool further includes a carrier plate on which said first and second auxiliary mold halves are mounted and supported.

7. The molding apparatus according to claim 1, wherein said intermediate mold tool further includes support rails extending from said working position to said idle position, a frame that carries said first and second auxiliary mold halves, and rollers or slide blocks that movably support said frame on said support rails to allow said frame to roll or slide along said support rails.

8. The molding apparatus according to claim 1, wherein said intermediate mold tool further includes an intermediate tool frame that releasably carries said first and second auxiliary mold halves so that said first and second auxiliary mold halves can be lifted away from said intermediate tool frame.

9. The molding apparatus according to claim 1, further comprising a machine frame, wherein said first mold half is arranged stationary and fixed along a direction from said first mold half to said second mold half relative to said machine frame, and said second mold half and said first and second auxiliary mold halves are each movable in said direction relative to said machine frame.

10. The molding apparatus according to claim 9, wherein said second mold tool further includes a stroke drive device that is connected to said second mold half and that moves said second mold half along said direction relative to said machine frame, said intermediate mold tool does not include an active stroke drive device that moves said first and second auxiliary mold halves along said direction relative to said machine frame, and said second mold half passively carries and moves said first and second auxiliary mold halves when said second mold half is moved by said stroke drive device.

11. The molding apparatus according to claim 1, wherein said first mold tool further includes a first stroke drive device connected to said first mold half to move said first mold half along a direction from said first mold half to said second mold half, and said second mold tool further includes a second stroke drive device connected to said second mold half to move said second mold half along said direction.

12. The molding apparatus according to claim 1, wherein said first mold tool further includes a first stroke drive device connected to said first mold half to move said first mold half along a direction from said first mold half to said second mold half, and said second mold tool further includes a second stroke drive device connected to said second mold half to move said second mold half along said direction.

13. The molding apparatus according to claim 1, further comprising contour processing devices that are mounted on at least one of said mold halves and that are adapted to form a specified contour edge of a respective layer of the multi-layered molded component.

14. The molding apparatus according to claim 13, wherein said contour processing devices comprise stamp-cutting elements.

15. The molding apparatus according to claim 1, wherein at least one of said mold tools further comprises, provided on said mold half thereof, at least one of the features selected from the group of features consisting of channels connected to a source of a heating or cooling liquid, holes connected to a source of vacuum or pressure and communicating into a respective one of said cavities, and holding needles adapted to hold a respective layer of the multi-layered molded component.

16. The molding apparatus according to claim 1, further comprising a seal arrangement including a seal strip mounted on and protruding from one of said mold halves, and a seal gap in which said seal strip can be received, provided on another of said mold halves mating with said one of said mold halves.

17. A method of using the molding apparatus according to claim 1 to form the molded component, comprising the following steps:
a) moving said first auxiliary mold half into said working position;
b) introducing said first material layer between said first mold half and said first auxiliary mold half;
c) in said first molding step, closing said first mold half relative to said first auxiliary mold half to enclose said first pre-molding cavity therebetween with said first material layer therein, so as to pre-mold said first material layer;
d) holding said first material layer on said first mold half while opening said first mold half relative to said first auxiliary mold half;
e) providing said second material layer as a pre-molded second material layer on said second mold half;
f) moving said first auxiliary mold from said working position to said idle position; and
g) in said second molding step, closing said first mold half relative to said second mold half to enclose said final molding cavity therebetween with said first material layer and said second material layer therein, so as to laminate together and finally mold said first and second material layers to form thereof said multi-layered molded component.

18. The method according to claim 17, wherein said step a) comprises moving said second auxiliary mold half into said working position opposite and adjacent to said first auxiliary mold half, introducing said second material layer as an un-molded second material layer between said second auxiliary mold half and said second mold half, further in said first molding step closing said second mold half relative to said second auxiliary mold half to enclose said second pre-molding cavity therebetween with said un-molded second material layer therein, so as to pre-mold said un-molded second material layer to form thereof said pre-molded second material layer, and holding said pre-molded second material layer on said second mold half while opening said second mold half relative to said second auxiliary mold half.

19. The molding apparatus according to claim 1, wherein said first and second mold halves are arranged one above another and vertically aligned with one another, said first auxiliary mold half is laterally movable between said working position in which said first auxiliary mold half is located vertically aligned in said working space between said first and second mold halves and said idle position in which said first auxiliary mold half is located laterally away from and clear of said working space, and said at least one of said mold halves that is movable is vertically movable.

20. The molding apparatus according to claim 19, wherein said first mold half is an uppermost mold half and is arranged vertically aligned above said second mold half, which is a lowermost mold half.

21. A molding apparatus for forming a multi-layered molded component, comprising:
a first mold tool including a first mold half;
a second mold tool including a second mold half; and
an intermediate mold tool including a first auxiliary mold half, a second auxiliary mold half, and an intermediate tool frame that releasably carries said first and second auxiliary mold halves so that said first and second auxiliary mold halves can be lifted away from said intermediate tool frame;
wherein:
said first mold half is arranged facing and aligned with said second mold half;
said first and second auxiliary mold halves are movably arranged so as to be movable between a working position in which said first and second auxiliary mold halves are respectively located aligned in a working space between said first mold half and said second mold half, and an idle position in which said first and second auxiliary mold halves are respectively located away from and clear of said working space;
said first auxiliary mold half and said first mold half are respectively contoured to cooperate and mate with each other while enclosing a first pre-molding cavity therebetween;
said second auxiliary mold half and said second mold half are respectively contoured to cooperate and mate with each other while enclosing a second pre-molding cavity therebetween;
said first mold half and said second mold half are respectively contoured to cooperate and mate with each other while enclosing a final molding cavity therebetween; and
at least one of said mold halves is movable to selectively open and close said first mold half relative to said first auxiliary mold half and to selectively open and close said second mold half relative to said second auxiliary mold half so as to selectively open and close said first pre-molding cavity and said second pre-molding cavity respectively in a first molding step when said first auxiliary mold half and said second auxiliary mold half are respectively located in said working position, and to selectively open and close said first mold half relative to said second mold half so as to selectively open and close said final molding cavity therebetween in a second molding step when said first auxiliary mold half and said second auxiliary mold half are respectively located in said idle position.

22. The molding apparatus according to claim 21, further comprising a machine frame, wherein said first mold half is arranged stationary and fixed along a direction from said first mold half to said second mold half relative to said machine frame, and said second mold half and said first and second auxiliary mold halves are each movable in said direction relative to said machine frame.

23. The molding apparatus according to claim 22, wherein said second mold tool further includes a stroke drive device that is connected to said second mold half and that moves said second mold half along said direction relative to said machine frame, said intermediate mold tool does not include an active stroke drive device that moves said first and second auxiliary mold halves along said direction relative to said machine frame, and said second mold half passively carries and moves said first and second auxiliary mold halves from said intermediate tool frame toward said first mold half when said second mold half is moved by said stroke drive device.

24. The molding apparatus according to claim 23, wherein said intermediate mold tool further includes a spring support mechanism against which said second mold half contacts to carry-and-move said first and second auxiliary mold halves from said intermediate tool frame.

25. A molding apparatus for forming a multi-layered molded component, comprising:
  a first mold tool including a first mold half;
  a second mold tool including a second mold half;
  an intermediate mold tool including a first auxiliary mold half; and
  a seal arrangement including a seal strip mounted on and protruding from one of said mold halves, and a sealing and clamping strip provided on another of said mold halves mating with said one of said mold halves, wherein said sealing and clamping strip has extending therealong a longitudinal slit which forms therein a seal gap in which said seal strip can be received, and wherein said seal strip is arranged and adapted to push a layer of the multi-layered molded component along with said seal strip into said longitudinal slit;
wherein:
  said first mold half is arranged facing and aligned with said second mold half;
  said first auxiliary mold half is movably arranged so as to be movable between a working position in which said first auxiliary mold half is located aligned in a working space between said first mold half and said second mold half, and an idle position in which said first auxiliary mold half is located away from and clear of said working space;
  said first auxiliary mold half and said first mold half are respectively contoured to cooperate and mate with each other while enclosing a first pre-molding cavity therebetween;
  said first mold half and said second mold half are respectively contoured to cooperate and mate with each other while enclosing a final molding cavity therebetween; and
  at least one of said mold halves is movable to selectively open and close said first mold half relative to said first auxiliary mold half so as to selectively open and close said first premolding cavity therebetween in a first molding step when said first auxiliary mold half is located in said working position, and to selectively open and close said first mold half relative to said second mold half so as to selectively open and close said final molding cavity therebetween in a second molding step when said first auxiliary mold half is located in said idle position.

26. The molding apparatus according to claim 25, wherein said intermediate mold tool does not include another auxiliary mold half that faces said second mold half when said first auxiliary mold half is in said working position.

27. The molding apparatus according to claim 25, wherein said intermediate mold tool further includes a second auxiliary mold half, which is movable between said working position and said idle position, and which faces and is contoured to cooperate and mate with said second mold half while enclosing a second premolding cavity therebetween in said first molding step when said second auxiliary mold half is located in said working position.

28. A molding apparatus for forming a multi-layered molded component from sheet material layers, comprising:
  a first mold tool including a first mold half;
  a second mold tool including a second mold half;
  an intermediate mold tool including a first auxiliary mold half; and
  a first carrier frame that is movably arranged between said first mold half and said first auxiliary mold half;
wherein:
  said first mold half is arranged facing and aligned with said second mold half;
  said first auxiliary mold half is movably arranged so as to be movable between a working position in which said first auxiliary mold half is located aligned in a working space between said first mold half and said second mold half, and an idle position in which said first auxiliary mold half is located away from and clear of said working space;
  said first auxiliary mold half and said first mold half are respectively contoured to cooperate and mate with each other while enclosing a first pre-molding cavity therebetween;
  said first carrier frame is arranged and adapted to carry and hold in said first pre-molding cavity a first one of said sheet material layers to form a cover layer of the multi-layered molded component;
  said first mold half and said second mold half are respectively contoured to cooperate and mate with each other while enclosing a final molding cavity therebetween; and
  at least one of said mold halves is movable to selectively open and close said first mold half relative to said first auxiliary mold half so as to selectively open and close said first pre-molding cavity therebetween in a first molding step when said first auxiliary mold half is located in said working position, and to selectively open and close said first mold half relative to said second mold half so as to selectively open and close said final molding cavity therebetween in a second molding step when said first auxiliary mold half is located in said idle position.

* * * * *

UNITED STATES PATENT AND TRADEMARK OFFICE
CERTIFICATE OF CORRECTION

PATENT NO. : 7,101,503 B2  
APPLICATION NO. : 10/370012  
DATED : September 5, 2006  
INVENTOR(S) : Spengler et al.

It is certified that error appears in the above-identified patent and that said Letters Patent is hereby corrected as shown below:

Title page,
Item [57], Abstract,
Line 2, replace "upper-most" by --uppermost--;

Column 1,
Line 13, replace "1. Field of the Invention" by --FIELD OF THE INVENTION--;
Line 18, replace "2. Background Information" by --BACKGROUND INFORMATION--;

Column 2,
Line 46, after "contour of the", replace "Lower" by --lower--;

Column 3,
Line 37, after "cover layer", insert --,--;

Column 14,
Line 2, before "comprises", replace "a)" by --e)--;

Column 15,
Line 31, after "carry", replace "and-move" by --and move--;

Column 16,
Lines 4 and 21, replace "premolding" by --pre-molding--.

Signed and Sealed this

Twenty-seventh Day of March, 2007

JON W. DUDAS  
*Director of the United States Patent and Trademark Office*